Sept. 26, 1967  JEAN-PAUL DELISLE  3,343,401
METHOD AND APPARATUS FOR CONTINUOUSLY MEASURING LIQUID
METAL OXIDE SATURATION TEMPERATURE
Filed June 1, 1964

INVENTOR

JEAN-PAUL DELISLE

BY

*Bacon & Thomas*

ATTORNEYS

United States Patent Office 3,343,401
Patented Sept. 26, 1967

3,343,401
METHOD AND APPARATUS FOR CONTINUOUSLY MEASURING LIQUID METAL OXIDE SATURATION TEMPERATURES
Jean-Paul Delisle, Manosque, Basses-Alpes, France, assignor to Commissariat à l'Energie Atomique, Paris, France
Filed June 1, 1964, Ser. No. 371,693
Claims priority, application France, June 14, 1963, 938,208
9 Claims. (Cl. 73—17)

Certain metals can readily be employed in liquid form and placed in structural materials which do not form compounds with such metals. It seldom occurs, however, that these materials are devoid of impurities which react with liquid metal. The most important of these impurities is oxygen. Now, oxygen has the effect of oxidizing liquid metal and, when its concentration becomes too high or when the temperature falls, the oxide of the metal precipitates and forms a deposit on the walls of the pipes in which it circulates, thereby entailing the risk of clogging.

Provision has therefore been made in plants which make use of liquid metals for devices or "traps" which retain or reduce the oxide content of the metal and thus maintain its concentration at a suitable value. However, it must be possible to check the effective operation of said traps or to know at any time if, in spite of their action, the oxide content is increasing or in any way liable to reach a critical value. In point of fact, it is well known that this content can be deduced from the temperature of saturation of the metal.

The present invention is therefore concerned with a method for the continuous measurement of the oxide saturation temperature of a metal by the constant maintenance of a condition of equilibrium between the oxide and the metal, the temperature of this equilibrium being the saturation temperature which is a function of the concentration.

This method is characterized in that it consists in causing the metal to flow through a series of small calibrated orifices, in maintaining the rate of flow of said metal at a constant value which corresponds to a predetermined oxide deposition, in controlling the temperature in the vicinity of said orifices in dependence on said constant rate of flow, and in measuring said temperature which is the temperature of oxide saturation of the metal.

The present invention also extends to a device for the application of said method and the continuous measurement of the oxide saturation temperature of the metal.

The device according to the invention is characterized in that it comprises a conduit for the circulation of the liquid metal which is partially obturated at one point by means of a perforated capsule or plate, a cooling unit disposed around said conduit in the vicinity of said perforated plate, a thermometric element for measuring the temperature of the fluid adjacent said plate, a flow meter for measuring the rate of flow of the metal and means for regulating said cooling unit so as to maintain the temperature adjacent the plate at a value which corresponds to a constant rate of flow and to a stable partial precipitation of the oxide within the plate.

The measurement of the temperature at the level of the partially obstructed plate which corresponds to a constant rate of flow of the liquid, permits a continuous recording of this temperature of equilibrium between the metal and a certain oxide deposition.

A number of other advantages and characteristic features of the invention will, in any case, become apparent from the detailed description which now follows and which is given solely by way of example without implied limitation.

According to the method of the invention, the liquid metal to be checked is progressively cooled in such a manner as to bring its temperature close to the temperature of precipitation of the oxide contained in the metal, this temperature depending on its concentration. During the cooling process, the liquid is conveyed to a series of calibrated orifices of small size and the rate of discharge from said orifices or outflow rate is measured as well as the temperature of the liquid which flows through said orifices.

When the aforesaid temperature is sufficiently low, the oxide precipitates and is deposited within the orifices which are thus progressively clogged up. The outflow rate accordingly decreases and reaches a value which corresponds to a given partial obstruction, for example, one half or two thirds of the calibrated orifices. By maintaining the outflow rate at the value which corresponds to the partial obstruction which is chosen, as a result of suitable regulation of the cooling of the liquid which flows through the orifices, the temperature which corresponds to this partial precipitation or saturation temperature can be known at each moment.

The checking of a liquid metal circulation system in a thermal plant can thus be automatically performed in an effective and uninterrupted manner, which is very important, especially in thermal plants.

Since the measurement of temperature can be effected at each moment with a high degree of accuracy, the saturation temperature can be known with an equally high degree of accuracy.

The single figure of the accompanying drawings shows diagrammatically one form of embodiment of a device for the practical application of the method according to the invention.

The said device, which is intended to be mounted in a plant for the utilization of a liquid metal, comprises an economizer 1 which consists of two coaxial tubes, one coaxial tube 2 being fitted with a connector-tube or inlet nozzle 3 for the admission of liquid metal containing oxide while the other coaxial tube 4, which is located within the interior of the first, serves as an outlet tube for discharge of the fluid which has been checked. The inner tube 4 communicates at the extremity thereof with the tube 2 which is partially obstructed by a plate 6, said plate being pierced with a certain number of calibrated orifices.

Fins 8, for the purpose of cooling the region which is adjacent the plate 6, are fixed on the outer tube 2 and the corresponding portion of the economizer 1 is surrounded by a chamber 10 through which circulates a cooling fluid such as air, for example. The said chamber 10 is fed from a blower 12 to which it is connected by means of a duct 14 fitted with a valve 16.

A thermocouple 18, for measuring the temperature of the liquid which is present adjacent the plate 6, is fitted within a hollow plug which passes through the end portion of the economizer 1. The said thermocouple is connected to a recording device 19 which thus indicates at each moment the temperature of the point of the said device which is coldest and which has the smallest diameter, that is to say the point at which the equilibrium of dissolution is maintained.

At the outlet of the economizer 1, a flow meter 20 measures the rate of flow of the liquid which is a function of the size of passage left within the plate 6 by the deposited oxide.

The above-mentioned flow meter 20 controls, through the intermediary of a flow regulator 24, the valve 16 which controls the admission of the cooling fluid.

Progressively, as the cooling of the liquid metal takes place, first within the economizer 1 in contact with the cold liquid which passes out through the tube 4, then within the cooling chamber 10 in contact with fresh air, the oxide contained in the metal comes close to the temperature below which it precipitates and accordingly tends to form a deposit. The plate 6, which is the coldest point as well as having the smallest diameter of passage, is the first point at which this precipitation takes place.

In accordance with the method of the invention, the flow regulator 24 has been so adjusted as to maintain a constant flow rate within the tube 4, said flow rate corresponding to a partial obturation of one-half or two-thirds, for example.

As long as the temperature within the plate 6 permits the oxide to remain in solution in the metal and to flow through the orifices of the plate, the flow meter transmits an opening order to the flow regulator and the valve 16 and the cooling of the plate continues. But when the temperature falls below the saturation temperature and causes the precipitation of the oxide, the reduction of the passageway which is provided through the plate 6 reduces the flow rate within the tube 4. As soon as the value of the reference flow rate of the flow regulator is reached, the flow meter controls the flow regulator and the valve 16 so as to produce a reduction in the admission of air and a slowing down of the cooling process.

However, should a difference appear between the actual flow rate and the reference flow rate, said difference being caused by a variation in the deposition of oxide, the flow regulator comes into action and operates the cooling air valve 16 in such a manner as to restore the oxide deposition to its previous value.

As a precautionary measure, a follow-up control device 22 is mounted between the flow regulator 24 and the valve 16 and is connected to the temperature recording unit 19 in such manner as to close the valve 16 as soon as the temperature falls below a critical value, which, in the case of sodium for example, is below 98° C., in order to prevent the freezing or solidification of this metal.

The measurement of the oxide saturation temperature of a metal in the liquid state can thus be effected in a continuous and automatic manner, the value of this temperature being known at each moment and any variation which results from a modification in composition being immediately recorded.

Moreover, this method as well as the device for the practical application of said method permit the possibility of measuring the saturation temperature with a high degree of accuracy of the order of ±1° C. In point of fact, both the flow meter and the flow regulator have very high sensitivity, the response of the valve is very rapid and the thermal inertia of the cooling process is very low.

In accordance with an alternative form of embodiment, the device can be provided upstream of the economizer inlet with a bypass 25 for uncooled metal which is fitted with a diaphragm 26 through which the flow rate is measured. The indications of the rate of flow through the diaphragm 26 and of the rate of flow through the tube 4, as indicated by the flow meter 20, are transmitted to the device 24 for controlling the valve 16 which is subjected to the difference between these rates of flow, said difference being maintained at a zero value by the regulation.

The device for controlling the valve 16 could also be subjected to the ratio of the rates of flow through the diaphragm 26 to the rates of flow through the tube 4, this ratio being maintained at a constant value by the regulator.

This method of control in dependence either on the difference or ratio between two rates of flow makes it possible to eliminate disturbances caused by variation of pressure of the metal within the piping system which supplies the device.

It will be understood that a number of other modifications could also be made in the form of embodiment of the invention which has just been described by way of non-limitative example, without thereby departing from the scope of this invention. In particular, the flow meter 20 could be mounted at the inlet of the economizer 1, for example, in the inlet tube or nozzle 3.

What is claimed is:

1. Device for the continuous measurement of the oxide saturation temperature of a liquid metal, said device comprising a conduit for the circulation of liquid metal which is partially obturated at one point by a perforated plate, characterized in that said conduit comprises an economizer consisting of two coaxial tubes wherein one tube is an outer tube for the admission of hot liquid metal and the other is an inner tube for the discharge of cooled metal liquid which has passed through the perforated plate, a cooling unit placed around said economizer in the vicinity of the perforated plate, a thermometric element for measuring the temperature of liquid metal adjacent said plate, a flow meter for measuring the rate of outflow of said metal and means for automatically controlling the cooling unit in dependence on a constant value of the flow rate and in dependence on a stable partial precipitation of the oxide of the metal within the perforation of said plate.

2. Device in accordance with claim 1, characterized in that said cooling unit includes fins which are fixed on the extremity of the tube for the admission of metal and a chamber through which circulates a cooling fluid and which is mounted around said finned portion of the tube.

3. Device in accordance with claim 2, characterized in that the flow meter is operably connected with a regulating device for controlling the flow of a cooling fluid through said cooling unit.

4. Device in accordance with claim 2, characterized in that said means for automatically controlling the cooling unit comprising a flow regulator which is operably connected with the flow meter and responsive thereto operably connected with said flow regulator for regulating the circulation of the cooling fluid through said chamber.

5. Device in accordance with claim 1, characterized in that said thermometric element includes a temperature-recording unit and said device includes means operably connecting said temperature-recording unit and said cooling unit and responsive to a temperature below a predetermined critical value for terminating operation of said cooling unit.

6. Device in accordance with claim 1, characterized in that it comprises a bypass for uncooled metal fitted with a bypass flow meter for measuring the flow rate in said bypass.

7. Device in accordance with claim 6, characterized in that the means for automatically controlling the cooling unit is subjected to the difference between the outflow rate of the liquid metal within the bypass and the outflow rate from the cooling unit, said difference being maintained at a constant value.

8. Device in accordance with claim 6, characterized in that the means for automatically controlling the cooling unit is subjected to the ratio of the flow rate of the liquid metal within the bypass to the flow rate from the cooling unit, said ratio being maintained at a constant value.

9. A method for the continuous measurement of the oxide saturation temperature of a liquid metal, comprising: causing liquid metal to flow through a series of calibrated orifices; cooling said liquid metal in the vicinity of said orifices sufficiently to precipitate a layer of the oxide of the metal in said orifices and to partially obturate them; measuring the outflow rate of the liquid metal; continuously measuring the temperature of said liquid metal in the vicinity of said orifices; and automatically controlling the cooling of the liquid metal as a function of said temperature and said outflow rate for maintaining said outflow rate at a constant value which corresponds to a predetermined oxide deposition in said orifices.

References Cited

UNITED STATES PATENTS

| | | | |
|---|---|---|---|
| 2,643,541 | 6/1953 | McCreary | 73—25 |
| 2,997,874 | 8/1961 | Billuris | 73—61 |
| 3,200,637 | 8/1965 | Ballou et al. | 73—71 |

LOUIS R. PRINCE, *Primary Examiner.*

DANIEL YASICH, *Assistant Examiner.*